Figure 1:
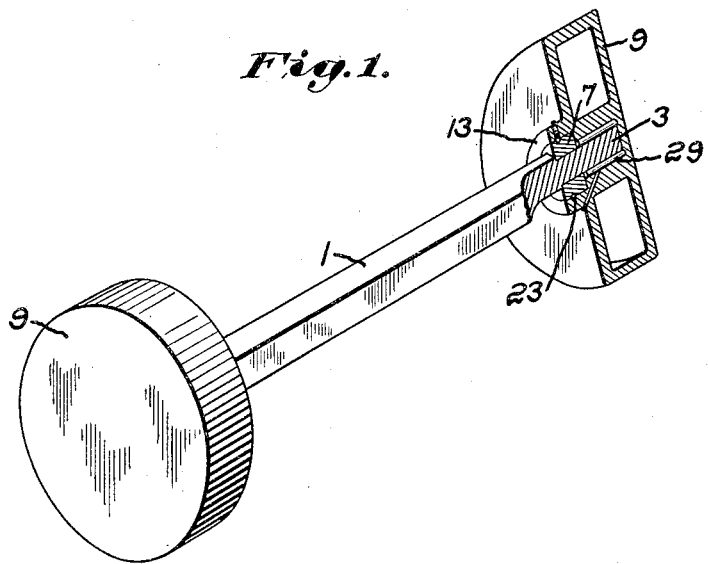

Aug. 19, 1924.

A. W. WARNOCK

ATTACHING DEVICE FOR SKID WHEELS

Filed March 23, 1923

1,505,913

Inventor:
Amos W. Warnock,
Attys.

Patented Aug. 19, 1924.

1,505,913

UNITED STATES PATENT OFFICE.

AMOS W. WARNOCK, OF SOMERVILLE, MASSACHUSETTS, ASSIGNOR TO CLARENCE H. YOUNG, OF BOSTON, MASSACHUSETTS.

ATTACHING DEVICE FOR SKID WHEELS.

Application filed March 23, 1923. Serial No. 627,150.

*To all whom it may concern:*

Be it known that I, AMOS W. WARNOCK, a citizen of the United States, and a resident of Somerville, county of Middlesex, State of Massachusetts, have invented an Improvement in Attaching Devices for Skid Wheels, of which the following description, in connection with the accompanying drawings, is a specification, like characters on the drawings representing like parts.

My invention which relates particularly but not exclusively to an attaching device for skid wheels and which has among its objects the provision of a support of this type wherein the wheels are free from projections likely to engage obstructions when the skid is moved will be best understood from the following description when read in light of the accompanying drawings showing one specific embodiment of my invention selected for illustrative purposes, while the scope of my invention will be more particularly pointed out in the appended claims.

In the drawings:—

Figure 2:
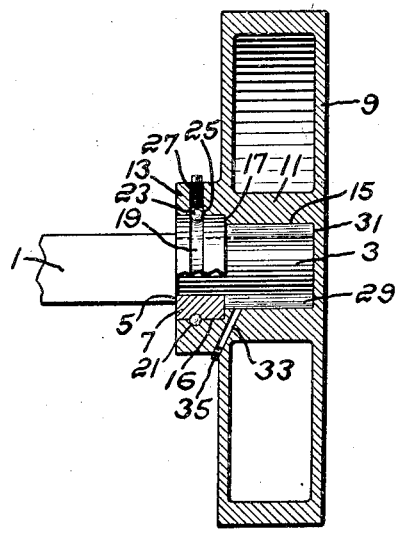

Fig. 1 is a perspective with parts in section of an axle and associated wheels for a skid; and Fig. 2 is a transverse section through one of the wheels with parts broken away.

Referring to the drawings and to the preferred embodiment of my invention I have shown an axle 1 of square cross section which it will be understood in practice is secured to the body of the skid. At its ends the axle has a reduced cylindrical portion 3 which with the body of the axle forms a shoulder 5. Placed over each cylindrical portion 3 and abutting the shoulder 5 is a collar 7 which preferably is shrunk on said cylindrical portion so as to form substantially an integral part of the axle.

In the present embodiment of my invention each wheel is formed as a hollow cylindrical disk 9 having a hub 11 which extends beyond the inner side of the wheel to present an annular boss 13. The hub is provided with a cylindrical bore 15 which receives the end portion 3 of the axle, the portion of the bore within the annular boss 13 being enlarged at 16 to provide a shoulder 17. The collar 7 is received within the bore 16 and as shown abuts the shoulder 17.

For preventing the wheel from moving lengthwise of the axle I form on the cylindrical surface of the collar 7 an annular groove 19 and concentric with this groove I form on the inner cylindrical surface of the annular boss 13 an annular groove 21. In the grooves 19 and 21 I place spherical rollers 23. For permitting insertion of the spherical rollers 23 I provide the annular boss 13 with a radial perforation 25 which intersects the groove 21. In an obvious manner the spherical rollers 23 may be placed in the grooves by way of the perforation 25 which perforation also provides a convenient means for lubricating the spherical rollers. For closing the perforation I provide a screw-plug 27.

For providing an anti-friction bearing for taking the vertical thrust of the wheel upon the axle I insert in the space between the cylindrical walls of the end portion 3 of the axle and the bore 15 a plurality of cylindrical rollers 29 which in the present embodiment of my invention are of such longitudinal extent as to abut at one end the collar 17 and at their other ends the bottom wall 31 of the bore 15. For lubricating the rollers 29 I provide the lubricant conveying passage 33 which extends from the inner surface of the wheel to the bore 15 and is closed at its outer end by means of a screw-plug 35.

Although I have described for purposes of illustration one specific embodiment of my invention it is to be understood that I am not limited thereby to its particular mechanical details, but that within the scope of the claims wide deviations may be made therefrom without departing from the spirit of my invention.

Claims—

1. The combination with a wheel having a hub with an axial opening, of an axle extending into said opening, longitudinally extending rollers between the end portion of said axle and the walls of said opening, said opening at one end being enlarged, said axle carrying a collar in said enlarged portion of said opening, said rollers being held in position by said collar, concentric annular grooves in the opposed peripheral walls of said enlarged portion of said opening and said collar, and said grooves carrying spherical rollers for preventing relative longitudinal movement of said wheel and said axle.

2. A wheeled support for a skid having in combination an axle carrying at opposite ends wheels, the inner sides of said wheels having each an annular boss surrounding said axle and said axle having collars diametrically substantially filling the interior of said annular bosses, the exterior faces of said collars being formed each with an annular groove and the interior faces of said annular bosses having each an annular groove concentric with the annular groove on said collar, said annular bosses having each an aperture communicating with the groove in said boss whereby spherical rollers may be placed in said grooves, said spherical rollers for preventing movement of said wheels lengthwise of said axle, the end portions of said axle extending into said wheels, longitudinally extending rollers in said wheels for taking the vertical thrust of said wheels on the end portions of said axle, and said rollers abutting at one end said collars for preventing endwise movement of said rollers.

3. A wheeled support for a skid having in combination an axle carrying at opposite ends wheels, the inner sides of said wheels having each an annular boss surrounding said axle and said axle having collars diametrically substantially filling the interior of said annular bosses, the exterior faces of said collars being formed each with an annular groove and the interior faces of said annular bosses having each an annular groove concentric with the annular groove on said collar, spherical rollers in said grooves for preventing movement of said wheels longitudinally of said axle, the end portions of said axle extending into said wheels, longitudinally extending rollers in said wheels for taking the vertical thrust of said wheels on the end portions of said axle, and said rollers abutting at one end said collars for preventing endwise movement of said rollers.

4. An axle for a skid carrying at opposite ends wheels, said wheels having hubs with cylindrical openings enlarged at the inner ends of said hubs and for receiving the end portions of said axle, said axle having collars in the enlarged portions of said openings, rollers for taking the vertical thrust of said wheels on said axle and held in position by said collars, and separate rollers cooperating with said collars for locking said wheels against motion lengthwise of said axle.

5. The combination with an axle, of a wheel having an axial bore for receiving said axle, longitudinally extending rollers for taking the vertical thrust between said wheel and said axle, a collar carried by said axle and cooperating with said rollers for retaining them in position, said collar being also received in said bore, and spherical rollers cooperating with said collar and said wheel for locking said wheel against endwise motion on said axle.

6. The combination with an axle, of a wheel having a bore of two diameters, the end portion of said axle being received in the portion of said bore of smaller diameter and said axle having a collar received in the portion of said bore of larger diameter, longitudinally extending rollers in said portion of said bore of smaller diameter for taking the vertical thrust of said wheel on said axle, said rollers at one of their ends being retained against axial motion relative to said axle by the bottom of said bore and at their other ends by said collar, and spherical rollers cooperating with said collar and the walls of the portion of said bore of larger diameter for retaining said axle against axial movement relatively to said wheel.

In testimony whereof, I have signed my name to this specification.

AMOS W. WARNOCK.